Jan. 3, 1967     C. M. VAN DER BURGT ETAL     3,296,511
ARRANGEMENT FOR THE REPRODUCTION OF ULTRASONIC OSCILLATIONS
Filed Sept. 11, 1963     3 Sheets-Sheet 1

INVENTORS
CORNELIS M. van der BURGT
HERMANUS S.J. PIJLS
BY
Frank P. Trifari
AGENT INVENTORS
CORNELIS M. van der BURGT
HERMANUS S.J. PIJLS
BY

*Frank R Dufau*

AGENT

United States Patent Office 3,296,511
Patented Jan. 3, 1967

3,296,511
ARRANGEMENT FOR THE REPRODUCTION OF ULTRASONIC OSCILLATIONS
Cornelis Martinus van der Burgt and Hermanus Stephanus Josephus, Pijls, both of Emmasingel, Eindhoven, Netherlands, assignors to North American Philips Company, Inc., New York, N.Y., a corporation of Delaware
Filed Sept. 11, 1963, Ser. No. 308,208
Claims priority, application Netherlands, Sept. 12, 1962, 283,155
20 Claims. (Cl. 318—116)

The invention relates to an arrangement for producing high power ultrasonic oscillations, for example, powers of from several watts to several kilowatts. More particularly, to an oscillator provided with feedback wherein the current of ultrasonic frequency produced by the oscillator being is supplied to a load circuit which includes a transducer from which an electric voltage is derived which is returned as the feedback voltage through a feedback circuit connected to the load circuit of the oscillator.

In such arrangements transducers of various types are used, for example, piezomagnetic or piezoelectric transducers, which are excited either at the series resonant frequency or at the parallel resonant frequency, depending upon the design of the ultrasonic oscillator. In accordance with the application, for example, for cleaning, emulsifying, soldering, welding, under-water signalling and the like, the transducers are designed for the production of frequencies lying in the frequency range of, say, from 3 kc./s. to 1,000 kc./s.

It is an object of the present invention to provide an arrangement of the above described type universally applicable to the various types of transducers for excitation either at the series resonant frequency or at the parallel resonant frequency, which arrangement whilst being simple in design and operation is distinguished by maximum efficiency in the conversion of electrical energy into mechanical vibration energy.

The arrangement in accordance with the invention is characterized in that in order to produce the feedback voltage the transducer is included in a bridge circuit. The transducer is connected in one bridge arm and an impedance including reactance is connected in another bridge arm while the other bridge arms comprise frequency-independent elements. The bridge is balanced by the impedance of the transducer in the clamped condition thereof at its natural frequency, the feedback voltage being derived from the bridge diagonal across which no voltage is set up when the transducer is clamped. In order to obtain a real output impedance irrespective of the load condition of the transducer, there is connected in the load circuit a reactance which together with the reactance of the load circuit is tuned to the natural frequency of the transducer.

By means of the invention, not only is a real output impedance obtained irrespective of the load condition of the transducer, so that an optimum power transfer to the load circuit is achieved, but it is also ensured that the transducer is excited exactly at its natural frequency, while the likelihood of parasitic oscillations is obviated.

Furthermore, in accordance with the invention the impedance of the bridge together with the impedance of the transducer when clamped produce a balanced condition of the bridge which depends upon the frequency.

In order that the invention be readily carried into effect, embodiments thereof will now be described by way of example, with reference to the accompanying diagrammatic drawings, in which:

FIGURE 8 shows the arrangement shown in FIGURE 7 in which the piezomagnetic transducer is replaced by its electric equivalent circuit, while

Figure 1:
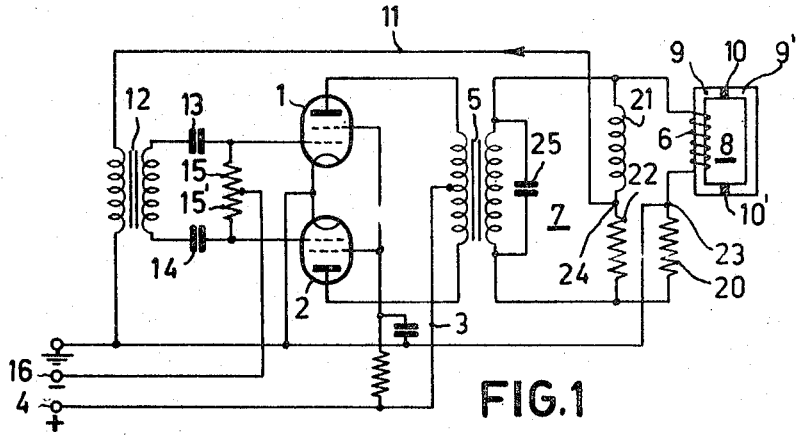
FIGURE 1 shows an embodiment of an arrangement in accordance with the invention using a piezomagnetic transducer operated at its series resonant frequency.

In the arrangement shown in FIGURE 1, ultrasonic energy having a frequency of 22 kc./s. is derived from a push-pull electron-tube oscillator comprising tetrodes 1 and 2. The anodes of tubes 1 and 2 are connected by a lead 3 to the positive terminal 4 of a voltage supply source. The arrangement shown is rated for a power of, say, from ten to one hundred watts.

The oscillator current produced upon oscillation of the electron-tube oscillator 1, 2 is supplied through a matching transformer 5 to the energizing coil of a piezomagnetic transducer 8 included in a load circuit 7 of the oscillator 1, 2 so that the transducer is caused to vibrate and delivers its mechanical vibration energy to the load, for example, a liquid bath. In the arrangement shown the piezomagnetic transducer is excited at its series resonant frequency.

In its structure the piezomagnetic transducer 8 comprises two I-shaped members 9, 9' made of piezomagnetic material having a small loss angle, for example, ferroxcube, which substantially consists of nonconductive cubic ferrites. The transducer further comprises two interposed plates 10, 10' made of permanent magnetic material in the form of, for example, ferroxdure, which consists on non-cubic crystals of polyoxides of iron and at least one of the metals barium, strontium, lead and, as the case may be, calcium. The use of ferroxcube as the piezomagnetic material provides the important advantage that in the piezomagnetic transducer 8 the conversion factor of the conversion of electrical energy to mechanical energy has a high value. The bias magnetization need not be effected by the permanent magnetic plates 10, 10' but may also be effected by other means, for example, by providing the piezomagnetic transducer 8 with a bias magnetization winding connected to a suitable bias voltage source.

In order to obtain the feedback voltage required for driving the tubes 1, 2 connected as an oscillator, a feedback circuit 11 is directly connected electrically to the load circuit 7. The feedback voltage derived from the load circuit 7 is applied through a feedback transformer 12 and grid capacitors 13, 14 to the control grids of the tetrodes 1, 2, which through grid resistors 15 and 15' are connected to the negative terminal 16 of a source of grid voltage. In the arrangement described the piezomagnetic transducer 8 with its mechanical load impedance forms the frequency-determining element of the oscillator 1, 2, so that the oscillator 1, 2 will oscillate at a frequency determined by the piezomagnetic transducer 8.

Figure 2:
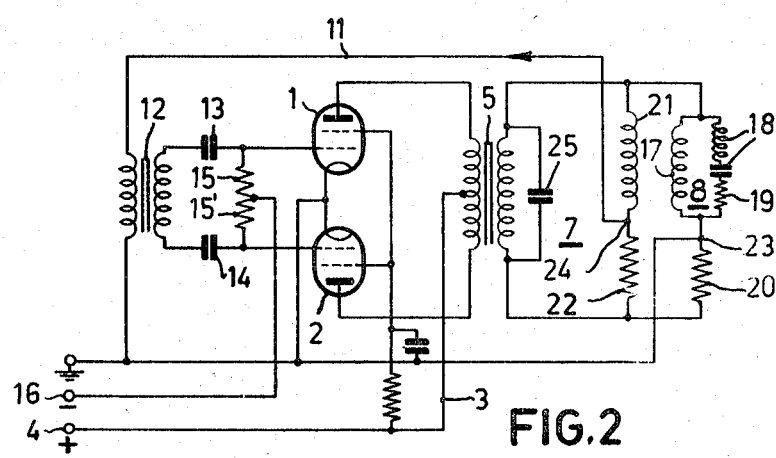
FIGURE 2 shows the embodiment shown in FIGURE 1, in which to illustrate the operation the piezomagnetic transducer is repaced by its equivalent circuit.

It has been found in practice that in the use of the arrangement so far described the efficiency of the conversion of electrical energy into mechanical vibration energy delivered by the piezomagnetic transducer 8 materially decreases when the transducer 8 is heavily loaded, and it has also been found that this phenomenon is due to the specific nature of the impedance formed by the piezomagnetic transducer 8, which is replaced by its electric equivalent circuit in FIGURE 2. As this figure shows, the electric impedance of the piezomagnetic transducer 8 substantially consists of an inductance 17 connected in parallel with the series combination of a series LC circuit 18 and a resistor 19. The resonant frequency of said LC circuit determines the series resonant frequency of the piezomagnetic transducer 8 while the resistor 19 substantially represents the load of the piezomagnetic transducer 8, and is measured when the piezomagnetic transducer 8 is clamped, that is to say, when the piezomagnetic transducer 8 is prevented from vibrating.

Figures 3A, 3B:
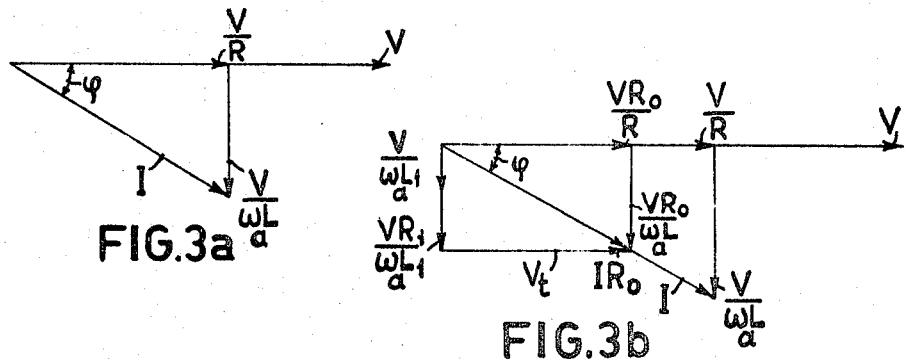
FIGURES 3a and 3b are vector diagrams illustrating the operation of the arrangement shown in FIGURE 1.

To illustrate the preceding dissertation, FIGURE 3a shows the current voltage diagram of the piezomagnetic transducer when a voltage V having a frequency $\omega_a$, which is exactly equal to the series resonant frequency $\omega_a$ of the piezomagnetic transducer 8, is set up across this transducer 8.

If in the electric equivalent circuit shown in FIGURE 2 the values of the resonance impedance of the damped series circuit 18, 19 and of the inductance 17 of the piezomagnetic transducer 8 are R and L respectively, then at the series resonant frequency $\omega_a$ the series circuit 18, 19 is traversed by a current of value $V/R$ in phase with the voltage V and the parallel inductance 17 is traversed by a current of value $$\frac{V}{\omega_a L}$$

the vectorial sum of these currents representing the total current I flowing through the piezomagnetic transducer 8. At the series resonant frequency $\omega_a$ of the piezomagnetic transducer 8 a phase difference $\phi$, the magnitude of which increases with increasing load, is produced between the current I and the voltage V.

If the piezomagnetic transducer 8 is connected in the load circuit 7 of the oscillator 1, 2 as the frequency-determining element, the oscillator 1, 2 will not oscillate exactly at the series resonant frequency $\omega_a$ of the piezomagnetic transducer 8, but will show a frequency deviation from this $\omega_a$. Therefore, to satisfy the condition of oscillation, the oscillator 1, 2 will adjust itself to a frequency $\omega$ such that for this frequency the impedance of the piezomagnetic transducer 8 comprising the parallel inductance 17 and the damped series circuit 18, 19 is real. Thus the piezomagnetic transducer 8 is in no case excited exactly at its series resonant frequency $\omega_a$ and this is the cause of the above mentioned phenomenon that when the piezomagnetic transducer 8 is loaded the conversion of electrical energy into mechanical vibration energy is poor.

To improve this conversion, in the arrangement shown, in order to produce the feedback voltage the piezomagnetic transducer 8 is included in a bridge circuit, the transducer 8 being connected in one bridge arm and an impedance 21 including reactance being connected in a second bridge arm. At the series resonant frequency $\omega_a$ this bridge circuit is balanced by the impedance of the transducer 8 when clamped, this impedance consisting substantially of the inductance 17, as has been set forth hereinbefore. In the arrangement shown, in which the transducer 8 is excited at its series resonant frequency, the transducer 8 is connected in series with a resistor 20 to form a bridge arm, the series combination of the transducer 8 and the resistor 20 being bridged by a second bridge arm comprising the series combination of an impedance 21 in the form of an inductance and a resistor 22. The feedback circuit 11 is connected to diagonal points 23 and 24 of the bridge which are constituted by the junction point of the piezomagnetic transducer 8 and the resistor 20 connected in series therewith in one arm and by a junction point 24 of the two impedances 21 and 22 in the other arm. When the resistor 20 connected in series with the piezomagnetic transducer has a value $R_0$ and the impedances of the inductance 21 and of the resistor 22 have the values $\omega_a L_1$ and $R_1$ respectively, the condition for balancing the bridge when the piezomagnetic transducer is clamped is:

$$\frac{R_0}{\omega_a L} = \frac{R_1}{\omega_a L_1} \qquad (I)$$

or:

$$\frac{R_0}{L} = \frac{R_1}{L_1} \qquad (II)$$

In order to reduce the losses to a minimum, that is to say, to reduce the power consumed by the resistor 20 and the impedances 21, 22 to a minimum, the resistor 20 connected in series with the piezomagnetic transducer must be appreciably smaller, and the impedance of the series combination of the resistor 22 and the inductance 21 must be considerably greater than, the impedance of the piezomagnetic transducer 8. For example, in an arrangement of the kind described, which was extensively tested in practice and in which the impedances of the parallel inductance 17 and of the series combination 18, 19 of the piezomagnetic transducer are 26 ohms and 35 ohms respectively, the resistor 20 connected in series with the piezomagnetic transducer 8 is 0.5 ohm and the impedances of the inductance 21 and of the resistor 22 in the other arm of the bridge circuit are 1,040 ohms and 20 ohms respectively.

The operation of the arrangement described will now be described more fully with reference to the vector diagrams shown in FIGURE 3.

In this figure the vector V represents the voltage across the bridge arms 8, 20 and 21, 22. The currents flowing through the damped series circuit 18, 19 and the parallel inductance 17 of the piezomagnetic transducer 8 at the series resonant frequency $\omega_a$ of the loaded transducer are substantially $V/R$ and $$V/\omega_a L$$

in the vector diagram shown in FIGURE 3b, since the influence of the very small resistor 20 of 0.5 ohm is negligible. In the manner described with respect to FIGURE 3a, the total current I flowing through the piezomagnetic transducer 8 is given by the vectorial sum of the partial currents $V/R$ and $$V/\omega_a L$$

respectively, and across the resistor $R_0$ this current I produces a voltage $IR_0$ which can be resolved into a component of value $$\frac{V}{R} \times R_0$$

in phase with the bridge voltage V and a quadrature component of value $$\frac{V}{\omega_a L} \times R_0$$

At the natural frequency $\omega_a$ the series combination of the inductance 21 and the resistor 22 is traversed by a current $$\frac{V}{\sqrt{(R_1)^2 + (\omega_a L_1)^2}}$$

which, since the magnitude of the resistance $R_1$ is only a small fraction of the impedance $\omega_a L_1$ of the inductance 21, is substantially equal to $$\frac{V}{\omega_a L_1}$$

This current produces a voltage $$\frac{VR_1}{\omega_a L_1}$$

across the resistor 22, so that the feedback voltage $V_t$ taken from the diagonal points 23, 24 of the bridge circuit 8, 20, 21, 22 is given by the voltage difference between the voltages across the resistor 20 in one bridge arm and across the resistor 22 in the other bridge arm. Hence, if in the manner described hereinbefore, the magnitude $$\frac{R_0}{\omega_a L}$$

is made equal to the magnitude $$\frac{R_1}{\omega_a L_1}$$

which determines the condition of bridge balance with the piezomagnetic transducer clamped, the voltage component across the resistor 20 of $$\frac{V}{\omega_a L} \times R_0$$

at right angles to the voltage V will be compensated for by the overall voltage $$\frac{V}{\omega_a L} \times R_1$$

across the resistor 22. Hence, a feedback voltage $V_t$ of value $$\frac{VR_0}{R}$$

exactly in phase with the voltage V across the bridge, which is determined only by the current $V/R$ flowing through the damped series circuit 18, 19, is taken from the diagonal points 23, 24, so that the damped series circuit 18, 19 now is the only frequency-determining element of the oscillator 1, 2.

In this embodiment of the bridge circuit, in which one bridge arm is constituted by the piezomagnetic transducer 8 and one bridge arm by the reactance 21, while the other bridge arms comprise resistors 22 and 23 respectively, the piezomagnetic transducer 8 is always excited at its series resonant frequency, and it is found that no parasitic oscillations are produced throughout the entire load range of the transducer 8.

Although the arrangement is structually simple, it always ensures that irrespective of the operating conditions a satisfactory efficiency of the conversion of electrical energy into mechanical vibration energy is obtained.

In order further to improve the efficiency whilst retaining the above mentioned advantages, in the arrangement shown the matching transformer 5 is shunted by a parallel capacitor 25 which together with the inductance of the load circuit 7 is substantially tuned to the series resonant frequency $\omega_a$ of the piezomagnetic transducer 8. This ensures that at the series resonant frequency $\omega_a$ the impedance of the load circuit 7 of the oscillator 1, 2 becomes real so that by suitable proportioning of the transformer 5 the oscillator tubes 1, 2 may be matched to the load. In addition, the resulting tuned load circuit forms a very low impedance for frequencies lying without its bandwidth, so that these oscillations cannot give rise to high voltages at the anodes of the tubes 1, 2, which otherwise may increase the tube dissipation. This step is of particular importance for oscillator tubes connected for class C operation wherein in which the pulsatory tube currents contain strong harmonic components.

If desired, the feedback transformer 12 may be tuned to the series resonant frequency $\omega_a$ of the piezomagnetic transducer 8 by means of a parallel capacitor, and this measure may be of particular importance when the oscillator tubes 1, 2 are controlled in grid current.

In addition to the above mentioned advantages of simplicity of structure, maximum conversion efficiency and satisfactory tube loading, the arrangement described is simple in operation since no frequency adjustment is required, while furthermore greater reliability is obtained.

Figure 4:
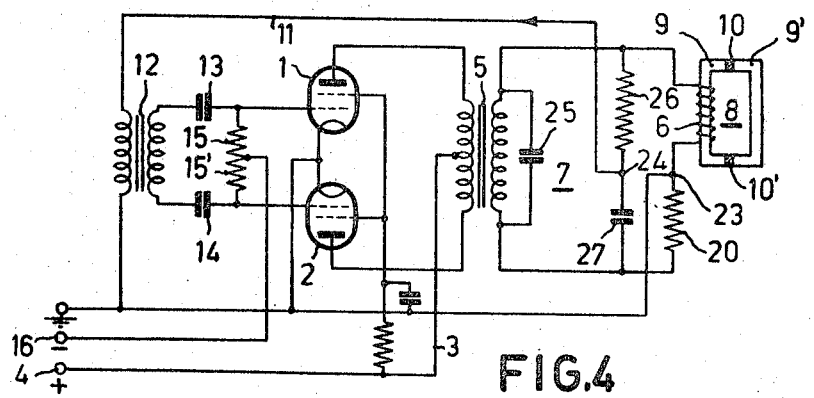
FIGURE 4 shows a modified embodiment of the arrangement shown in FIGURE 1.

FIGURE 4 shows a modified embodiment of the arrangement shown in FIGURE 1, which also has the said advantages. Corresponding elements are designated by like reference numerals.

Unlike the arrangement shown in FIGURE 1, in which the series combination of the piezomagnetic transducer 8 and the resistor 20 is bridged by the bridge arm comprising the series combination of the inductance 21 and the resistor 22, in this modification the latter bridge arm comprises the series combination of a resistor 26 and a capacitor 27.

The operation of this arrangement is the same as the arrangement shown in FIGURE 1, and to ensure that the piezomagnetic transducer 8 is exactly excited at its series resonant frequency $\omega_a$ irrespective of its load condition, the requirement that the bridge, comprising the piezomagnetic transducer, the resistor 20, the resistor 26 and the capacitor 27, is balanced when the piezomagnetic transducer 8 is clamped must again be satisfied. When the parallel inductance 17 of the piezomagnetic transducer 8 and the resistor 20 connected in series therewith have the values L and $R_0$ respectively, and the resistor 26 and the capacitor 27 have the values $R_1$ and $C_1$ respectively, this condition now reads:

$$\frac{R_0}{\omega_a L} = \frac{\frac{1}{\omega_a C_1}}{R_1} \qquad (III)$$

or:

$$\frac{R_0}{L} = \frac{1}{C_1 R_1} \qquad (IV)$$

Here again the condition applies that the balance of the bridge has to be independent of the frequency with clamped transducer, and this condition proves to be of particular importance in the arrangement in accordance with the invention if an optimum efficiency is to be obtained under any operating conditions. Extensive experiments have shown that otherwise, especially when the transducer is heavily loaded, the oscillator tends to shift to a frequency differing from the natural frequency of the transducer.

In this connection it should be noted that when the impedance of the clamped transducer is not a substantially pure reactance but includes a certain loss resistance, as is the case, for example, with piezomagnetic transducers of the laminated metallic type, the reactive impedance element in the bridge arm must also be provided with a resistor, which may be connected in series or in parallel with the reactance. A feature of all these modifications is that the condition of bridge balance is greatly independent of the frequency.

Figure 5:
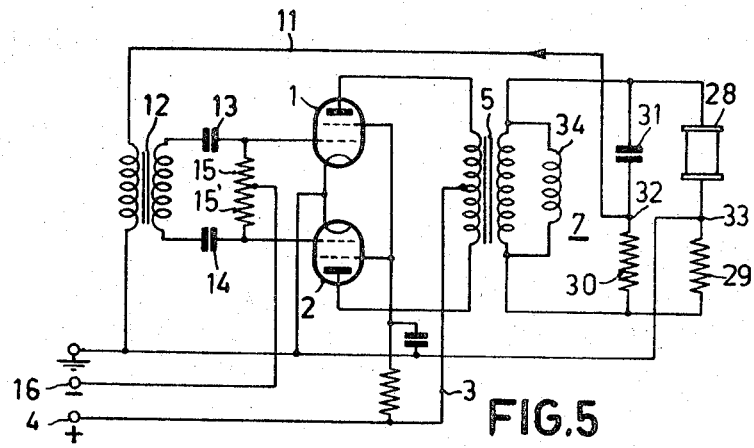
FIGURE 5 shows an arrangement in accordance with the invention using a piezoelectric transducer.

FIGURE 5 shows an arrangement in accordance with the invention in which the piezomagnetic transducer is replaced by a piezoelectric transducer 28 built up from prepolarized piezoelectric material having a small loss angle, for example, lead zirconate titanate.

Similarly to the transducers of the arrangements shown in FIGURES 1 and 4, the piezoelectric transducer 28 is connected in a bridge circuit. A resistor 29 is connected in series with the piezoelectric transducer 28 in one bridge arm while this series combination 28, 29 is bridged by a resistor 30 and a capacitor 31. The feedback voltage is derived from diagonal points 32 and 33 of the bridge circuit. Furthermore, in this embodiment the elements 29, 30, 31 of the bridge circuit also are proportioned so that at the series resonant frequency of the piezoelectric transducer 28 the bridge is balanced by the impedance of the clamped piezoelectric transducer 28, said impedance being substantially constituted by a parallel capacitance. If the parallel capacitance of the piezoelectric transducer 28 when clamped is C and the resistor 29, the capacitor 31 and the resistor 30 have the values $R_0$, $C_1$, $R_1$ respectively, the condition for bridge balance with clamped piezoelectric transducer is:

$$\frac{R_0}{\frac{1}{\omega_a C}} = \frac{R_1}{\frac{1}{\omega_a C_1}} \quad (V)$$

or:

$$R_0 C = R_1 C_1 \quad (VI)$$

In a manner identical to that used in the arrangements shown in FIGURES 1 and 4, the piezoelectric transducer 28 is excited exactly at its series resonant frequency irrespective of its load condition, so that a satisfactory efficiency of the conversion of electrical energy into mechanical vibration energy is always ensured. The fact that the piezoelectric transducer 28 at its series resonant frequency has a predominantly capacitative nature implies that, to obtain correct load matching, the matching transformer 5 now must be bridged by an inductance 34 which together with the capacitance of the load circuit 7 is approximately tuned to the series resonant frequency of the piezoelectric transducer.

Figure 6:
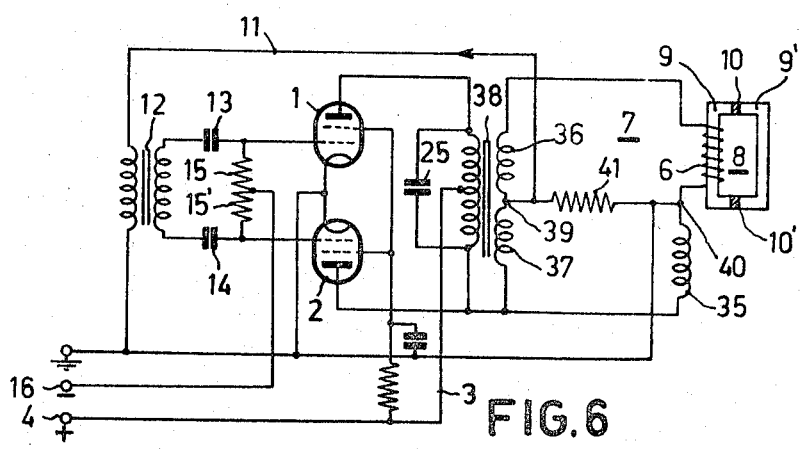
FIGURE 6 shows a further embodiment of an arrangement in accordance with the invention.

FIGURE 6 shows a modified embodiment of the arrangements described. Corresponding elements are designated by like reference numerals.

In this arrangement the piezomagnetic transducer 8 is again connected in a bridge circuit and, to form a bridge arm, the piezomagnetic transducer is connected in series with an inductance 35. The other bridge arm comprises two series connected windings 36 and 37 of a supply transformer 38. The feedback voltage is taken from a resistor 41 connected between diagonal points 39 and 40 of the bridge circuit, which are formed by the junction point 40 of the transducer 8 and the inductance 35 connected in series therewith in one arm, and by the junction point 39 of the series connected windings 36 and 37 of the supply transformer in the other arm.

Similarly to the bridges in the above described arrangements, the bridge of FIGURE 6 is balanced by the impedance of the piezomagnetic transducer when clamped and if the number of turns of the windings 36 and 37 is $n_1$ and $n_2$ respectively, so that across the two windings 36 and 37 voltages are set up which are proportional to the turns numbers $n_1$ and $n_2$, these voltages must be balanced by the voltages across the piezomagnetic transducer when clamped and across the inductance of the coil 35. When the inductance 17 (compare FIGURE 2) of the piezomagnetic transducer 8 has the value L and the inductance of the coil 35 has the value $L_1$, the condition for bridge balance can be written:

$$\frac{n_1}{n_2} = \frac{\omega_a L}{\omega_a L_1} \quad (VII)$$

or:

$$\frac{n_1}{n_2} = \frac{L}{L_1} \quad (VIII)$$

and this condition (VIII) also is independent of the frequency.

In the manner described hereinbefore, the feedback voltage $V_t$ taken from the resistor connected between the diagonal points 39 and 40 is in phase with the voltage across the bridge so that the piezomagnetic transducer 8 is excited exactly at its series resonant frequency $\omega_a$ under any operating conditions. It should be pointed out that this design of the bridge circuit provides the advantage that the current flowing through the inductance 35 and through the inductance 17 of the piezomagnetic transducer 8 compensate for each other in the resistor 41 so that the already small power loss due to the production of the feedback voltage is further reduced.

The bridge circuit may also be used with a piezoelectric transducer, in which case the piezomagnetic transducer must be replaced by a piezoelectric transducer and the inductance 35 must be replaced by a capacitor.

Figure 7:
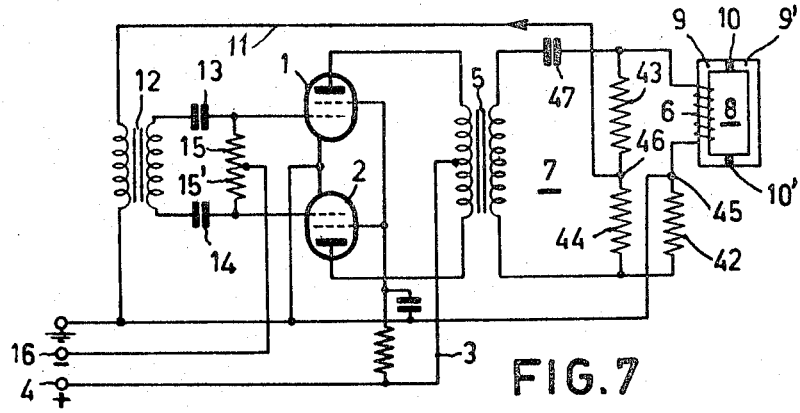
FIGURE 7 shows an arrangement in accordance with the invention employing a piezomagnetic transducer operated at its parallel resonant frequency.

FIGURE 7 shows an arrangement in accordance with the invention employing a piezomagnetic transducer 8 which is excited at its parallel resonant frequency $\omega_r$. Corresponding elements are designated by like reference numerals.

In this embodiment, the piezomagnetic transducer 8 is connected in series with an inductance 42 so as to form a bridge arm 8, 42 which is in turn shunted by the series combination of two resistors 43 and 44. The feedback voltage is taken from the junction point 45 of the piezomagnetic transducer 8 and the inductance 42 in one bridge arm and from the junction point 46 of the two series connected resistors 43 and 44 in the other bridge arm. In order to reduce energy losses in the bridge arm 43, 44 to a minimum, the impedance of this bridge arm 43, 44 is made greater than the impedance of the piezomagnetic transducer 8.

Similarly to the bridge circuits of the above described arrangements, the bridge circuit shown in FIGURE 7 is designed so that at the parallel resonance frequency $\omega_r$ of the piezomagnetic transducer 8 the bridge is balanced by the impedance of the piezomagnetic transducer 8 when clamped. If the resistors 43 and 44 have the values R and $R_1$ respectively, and the impedances of the piezomagnetic transducer 8 when clamped and of the inductance 42 have the values L and $L_1$ respectively, the condition for bridge balance is:

$$\frac{\omega_r L_1}{\omega_r L} = \frac{R_1}{R} \quad (IX)$$

or:

$$\frac{L_1}{L} = \frac{R_1}{R} \quad (X)$$

and this condition of balance (X) is again independent of the frequency. In the manner explained hereinbefore it is ensured that irrespective of the load condition the piezomagnetic transducer 8 is always excited exactly at its parallel resonant frequency $\omega_r$. In order to match the oscillator tubes 1 and 2 to the piezomagnetic transducer, that is to say, that the load circuit 7 forms a real impedance, a capacitor 47 is connected in this load circuit 7 in series with the piezomagnetic transducer 8. The capacitor 47 together with the inductance of the load circuit 7 is tuned to the parallel resonant frequency of the piezomagnetic transducer 8. If desired, the transformer 5 may be tuned by a parallel capacitor to the parallel resonant frequency of the piezomagnetic transducer 8, which is of particular advantage in oscillators connected for operation in Class C, in order to suppress harmonic frequencies across the transformer 5.

Figure 8:
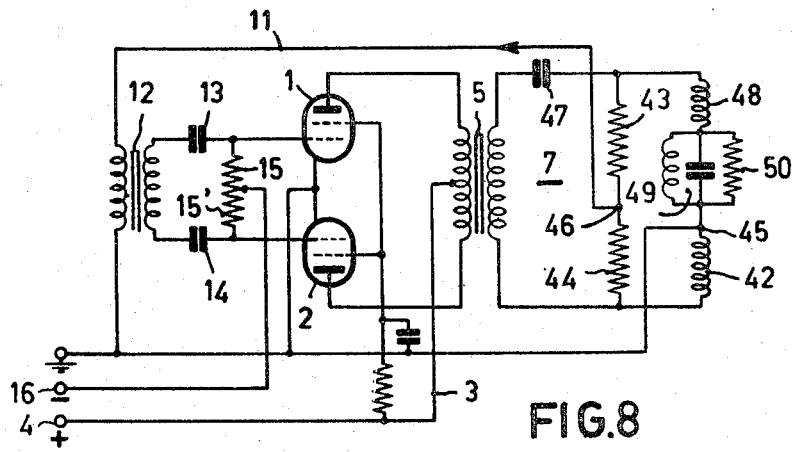
Figure 9:
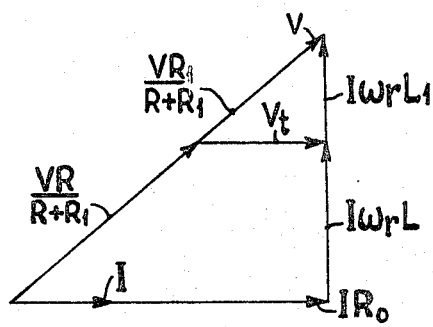
FIGURE 9 is a vector diagram illustrating the operation of the arrangement shown in FIGURE 7.

To illustrate the operation of the arrangement shown in FIGURE 7, FIGURE 8 again shows this arrangement but with the piezomagnetic transducer replaced by its electric equivalent circuit, while FIGURE 9 shows a vector diagram.

In order to explain the operation of the piezomagnetic transducer 8 at its parallel resonant frequency $\omega_r$ the electric equivalent circuit shown in FIGURE 8 can be used to advantage. The electric equivalent circuit of the piezomagnetic transducer 8 comprises a series inductance 48 of value L, which constitutes the impedance of the piezomagnetic transducer 8 when clamped, and a damped parallel LC circuit 49. The resonant frequency of circuit 49 is the parallel resonant frequency $\omega_r$ of the piezomagnetic transducer and the parallel resistor 50 which forms the load, while the impedance of the damped parallel circuit at the parallel resonant frequency has the value $R_0$.

The operation of this arrangement will now be explained with reference to the vector diagram shown in FIGURE 9. If in this vector diagram the current flowing through the bridge arm including the piezomagnetic transducer is represented by I, at the parallel resonant frequency $\omega_r$ of the piezomagnetic transducer this current I produces a voltage $IR_0$ in phase with this current. At the same time, across the series inductance 48 of the piezomagnetic transducer 8 and across the inductance 42, of values L and $L_1$ respectively, voltages $I\omega_r L$ and $I\omega_r L_1$ respectively, are produced which are 90° shifted in phase with respect to the current I. The voltage V across the bridge arm is obtained by the vectorial addition of the partial voltages $IR_0$, $I\omega_r L$ and $I\omega_r L_1$.

The same overall voltage V is set up across the bridge arm comprising the series combination of the resistors 43 and 44. Across each of these series resistors 43 and 44 proportional partial voltages $$\frac{VR}{R+R_1}$$

and $$\frac{VR_1}{R+R_1}$$

will be set up in proportion to the values R and $R_1$ of these series resistors 43 and 44 respectively. And in accordance with the condition (IX) or (X) for bridge balance, these voltages are in the same ratio as the voltages $I\omega_r L$ and $I\omega_r L_1$ set up across the series inductance 48 of the piezomagnetic transducer 8 and the inductance 42. Hence there is derived from the junction points 45 and 46 of the bridge circuit a feedback voltage $V_t$ which is exactly in phase with the current I flowing through the piezomagnetic transducer 8 and causes the piezomagnetic transducer 8 to be always excited at its parallel resonant frequency irrespective of the load condition. As a result, this arrangement also produces a maximum efficiency of the conversion of electrical energy into mechanical vibration energy.

The bridge circuit described can also be used for piezoelectric transducers provided that the inductance 42 in the bridge is replaced by a capacitor and the capacitor 47 in the load circuit 7 is replaced by an inductance. Furthermore, the bridge arm comprising the series combination of the resistors 43 and 44 may be replaced by the secondary winding of the matching transformer, and in this event this winding must be provided with a tapping in the manner shown in FIGURE 6.

Thus the use of the steps in accordance with the invention provides an ultrasonic generator which can be universally used for the various types of transducers and for operation either at the series resonant frequency or at the parallel resonant frequency and is distinguished by a maximum efficiency of energy conversion under any load conditions while being of simple design. This arrangement is suitable as such for use with groups of transducers, which for this purpose may be connected in series, in parallel or in a series parallel connection.

It should be noted that it may be desirable that optimum grid excitation of the oscillator tubes 1 and 2 should always be obtained irrespective of the operating conditions. In the arrangements described this is simply achieved by applying the feedback voltage taken from the diagonal points of the bridge circuit, if required after amplification, to a rectifier in order to produce a control voltage which is applied with negative polarity to the control grids of the amplifier tube.

What is claimed is:

1. Apparatus for generating electric oscillations of a given frequency comprising an amplifying device having input and output means, a load circuit including an ultrasonic transducer having a natural frequency of vibration at said given frequency, said load circuit further comprising a bridge circuit interconnecting said input means and said output means, said bridge circuit comprising first and second arms one of which includes said transducer and the other of which includes impedance means having a reactance component, said bridge circuit being arranged so that at said given frequency the bridge circuit is balanced by the clamped impedance of said transducer, and reactance means in said load circuit for tuning the load circuit to the natural frequency of said transducer, whereby oscillations are sustained in said apparatus substantially at said given frequency despite substantial variations in the load conditions of the transducer.

2. Apparatus as described in claim 1 wherein said bridge circuit further comprises third and fourth arms each of which includes a frequency-independent impedance element.

3. Apparatus for generating high power electric oscillations of a given frequency comprising an amplifying device having input means and output means, a load circuit comprising a bridge circuit having a pair of input terminals coupled to said output means and a pair of output terminals coupled to said input means for supplying a feedback voltage thereto, said bridge circuit further comprising first and second parallel connected branches each of which comprises a pair of series connected arms, an electromechanical transducer having a natural frequency of vibration at said given frequency and connected in one arm of said first branch and arranged to supply vibrating energy to a variable load, impedance means having a rectance component connected in a second arm of said bridge circuit, first and second frequency-independent impedance elements connected in the third and fourth arms of said bridge circuit, respectively, said bridge circuit being arranged so that at said given frequency the bridge circuit is balanced by the clamped impedance of said transducer, and reactance means coupled to said load circuit for tuning the load circuit to the natural frequency of said transducer.

4. Apparatus for generating electric oscillations of a given frequency comprising an amplifying device having input means and output means including a transformer having a primary winding and a tapped secondary winding, a load circuit comprising, in series, an ultrasonic transducer having a natural frequency of vibration at said given frequency and impedance means having a reactance component, means connecting said series circuit across said secondary winding to form therewith a bridge circuit, the component values of said bridge circuit being chosen so that at said given frequency the bridge is balanced with said transducer clamped to prevent vibration, means for applying to said amplifying device input means a feedback voltage derived across the secondary winding tap and the junction point between the transducer and said impedance means, and reactance means coupled to said load circuit for tuning the load circuit to the natural frequency of said transducer.

5. Apparatus as described in claim 3 wherein said frequency-independent impedance elements comprises resistors, said bridge circuit being arranged so that said transducer and one of said resistors are serially connected in one branch of the bridge so that said one resistor is traversed by the transducer current and said impedance means and the other resistor are serially connected in the other branch of the bridge.

6. Apparatus as described in claim 5 wherein said transducer is energized at its series resonant frequency and the resistance value of said one resistor is substantially less than the impedance of the transducer.

7. Apparatus for generating high power electric oscillations of a given frequency comprising an amplifying device having input means and output means, a load circuit comprising a bridge circuit having a pair of input terminals coupled to said output means and a pair of output terminals coupled to said input means for supplying a feedback voltage thereto, said bridge circuit further comprising first and second parallel connected branches each of which comprises a pair of series connected arms, an electromechanical transducer having a natural frequency of vibration at said given frequency connected in one arm of said first branch and arranged to supply vibrating energy to a variable load, a frequency-independent impedance element connected in the second arm of said first branch, said second branch comprising an inductance element in one arm thereof and a second frequency-independent element in the other arm, said bridge circuit being arranged so that with it energized by a voltage of said given frequency and with said transducer clamped to prevent vibration, at one bridge output terminal a first voltage is produced having a resistive and a reactive component and at the other output terminal a second voltage is produced having a reactive component which substantially cancels the reactive component of said first voltage whereby a net resistive feedback voltage is produced at said bridge output terminals.

8. Apparatus as described in claim 7 wherein said transducer and its load comprises the frequency-determining element of said oscillation generating apparatus.

9. Apparatus as described in claim 3 wherein the impedances in the bridge arms are balanced by the impedances of the transducer when clamped, this balance being independent of the frequency.

10. Apparatus as described in claim 3 wherein said impedance means containing the reactance is in the form of a pure reactance.

11. Apparatus as described in claim 3 wherein said impedance means containing the reactance comprises a reactance and a resistance.

12. Apparatus as described in claim 3 wherein the impedance of said second branch is substantially greater than the impedance of the transducer.

13. Apparatus as described in claim 4 in which the transducer is excited at its series resonant frequency, characterized in that the bridge includes a resistance which is traversed by the current of the transducer.

14. Apparatus as described in claim 4 wherein said resistance traversed by the current of the transducer is connected between the tapping point on the secondary winding of the transformer and the junction point of the transducer and said impedance means.

15. An arrangement as claimed in claim 13, characterized in that, in order to form a bridge branch, the resistance traversed by the current of the transducer is connected in series with the transducer, this series combination of the transducer and the resistance being bridged by a second bridge branch comprising the series combination of the impedance containing the reactance and the resistance, while the feedback circuit is connected to the diagonal points which are formed by the junction point of the transducer and the resistor connected in series therewith in one branch and by the junction point of the series connected impedances in the other branch.

16. Apparatus as described in claim 3 wherein the transducer is excited at its parallel resonant frequency, said bridge circuit being arranged so that the transducer is connected in series with the impedance containing the reactance and this series combination is bridged by a second bridge branch comprising the series combination of two resistances, the feedback voltage being derived from the diagonal bridge points which are constituted by the junction point of the transducer and the impedance connected in series therewith in one branch and by the junction point of the series connected resistances in the other branch.

17. Apparatus as described in claim 3 further comprising a matching transformer interconnecting said amplifying device output means and said bridge circuit input terminals, and wherein said transducer is of the magnetostrictive type which is excited at its series resonant frequency, characterized in that the matching transformer is bridged by a capacitor which together with the inductance of the load circuit is approximately tuned to the series resonant frequency of the transducer.

18. Apparatus as described in claim 3 further comprising a matching transformer interconnecting said amplifying device output means and said bridge circuit input terminals, and wherein said transducer is of the magnetostrictive type which is excited at its parallel resonant frequency, characterized in that there is connected between the matching transformer and the bridge circuit in the load circuit a series capacitor which together with the inductance of the load circuit is approximately tuned to the parallel resonant frequency of the transducer.

19. Apparatus as described in claim 3 further comprising a matching transformer interconnecting said amplifying device output means and said bridge circuit input terminals, and wherein said transducer is of the piezoelectric type which is excited at its series resonant frequency, characterized in that the matching transformer is shunted by an inductance which together with the capacitance of the load circuit is approximately tuned to the series resonant frequency of the transducer.

20. Apparatus as described in claim 3 further comprising a matching transformer interconnecting said amplifying device output means and said bridge circuit input terminals and wherein said transducer is of the piezoelectric type which is excited at its parallel resonant frequency, characterized in that there is connected between the matching transformer and the bridge circuit in the load circuit a series coil which together with the capacitance of the load circuit is approximately tuned to the resonant frequency of the transducer.

References Cited by the Examiner

UNITED STATES PATENTS

| 2,230,649 | 2/1941 | Mason | 331—139 X |
| 2,275,452 | 3/1942 | Meacham | 331—139 |
| 3,177,416 | 4/1965 | Pijis et al. | 331—157 X |

MILTON O. HIRSHFIELD, *Primary Examiner.*

A. J. ROSSI, *Assistant Examiner.*

PO-1050
(5/69)

UNITED STATES PATENT OFFICE
CERTIFICATE OF CORRECTION

Patent No. 3,296,511              Dated January 3, 1967

Inventor(s) CORNELIS M. VAN DER BURGT

It is certified that error appears in the above-identified patent and that said Letters Patent are hereby corrected as shown below:

In Figure 6 of the drawing, please remove the line connecting the bottom terminals of the primary and secondary windings of transformer 5.

Signed and sealed this 26th day January 1971.

(SEAL)
Attest:

Edward M. Fletcher, Jr.
Attesting Officer

WILLIAM E. SCHUYLER, JR.
Commissioner of Patents